United States Patent
Fan

(10) Patent No.: US 6,808,188 B1
(45) Date of Patent: Oct. 26, 2004

(54) STEERABLE SCOOTER

(75) Inventor: Jeeng-Neng Fan, No. 34, Alley 10, Lane 54, Sec. 2, Yangsin Rd., Yang mei (TW)

(73) Assignees: Jeeng-Neng Fan, Yang Mei (TW); Meei-Yuh Luo, Taoyuan (TW)

( * ) Notice: Subject to any disclaimer, the term of this patent is extended or adjusted under 35 U.S.C. 154(b) by 0 days.

(21) Appl. No.: 10/407,441

(22) Filed: Apr. 7, 2003

(51) Int. Cl.[7] .............................................. B62M 1/00
(52) U.S. Cl. ............................. 280/87.041; 280/87.01; 280/263
(58) Field of Search .................... 280/87.01, 87.041, 280/87.021, 87.03, 87.043, 87.05, 263, 87.042, 28.15, 264, 43.19, 27, 47.2, 842, 47.41, 11, 767, 218, 282, 293, 304, 809

(56) References Cited

U.S. PATENT DOCUMENTS

| | | | | |
|---|---|---|---|---|
| 1,253,768 A | * | 1/1918 | Aman | 280/87.041 |
| 1,267,050 A | * | 5/1918 | Brigel | 280/87.021 |
| 1,658,068 A | * | 2/1928 | White | 280/87.041 |
| 2,185,698 A | * | 1/1940 | Wright | 280/251 |
| 4,281,844 A | * | 8/1981 | Jackman et al. | 280/87.01 |
| 5,169,165 A | * | 12/1992 | Oates | 280/87.03 |
| 6,149,170 A | * | 11/2000 | Dotson | 280/87.021 |
| 6,375,208 B1 | * | 4/2002 | Lee | 280/245 |
| 6,378,642 B1 | * | 4/2002 | Sutton | 180/208 |
| 6,494,470 B2 | * | 12/2002 | Chang | 280/87.041 |
| 6,517,092 B2 | * | 2/2003 | Humphrey | 280/87.041 |
| 2002/0113404 A1 | * | 8/2002 | Yang | 280/293 |
| 2002/0130482 A1 | * | 9/2002 | Jang | 280/244 |
| 2002/0167146 A1 | * | 11/2002 | Chang | 280/87.041 |
| 2004/0032105 A1 | * | 2/2004 | Tsai | 280/87.041 |

FOREIGN PATENT DOCUMENTS

| | | | | |
|---|---|---|---|---|
| GB | 2263258 A | * | 7/1993 | B62K/13/00 |
| JP | 6-135368 | * | 6/1994 | B62M/1/04 |

* cited by examiner

Primary Examiner—Christopher P. Ellis
Assistant Examiner—J. Allen Shriver
(74) Attorney, Agent, or Firm—Rosenberg, Klein & Lee

(57) ABSTRACT

A steerable scooter is provided. The steerable scooter includes a single front wheel as well as two rear wheels that provides for leaning and directional control, with the front wheel and rear wheels arranged in a three-point, constant triangular formation that enables exceptional scooter stability and handling. Further, assisting wheels are installed on two sides at the bottom end of a rearwardly inclined front stem that are disposed marginally higher than and simultaneously articulated with the front wheel. Since the assisting wheels and front wheel form a triangular formation that is wide at the interior and narrow at the posterior, when the handlebar is turned for a larger angle, the arrangement is capable of effectively preventing slide out due to loss of lateral traction. Additionally, a freely adjustable and removable saddle is installed on the frame and the two rear wheels are equipped with a synchronized brake mechanism to allow safe riding and, furthermore, the option of enjoying the scooter of the present invention while seated or standing on one foot.

4 Claims, 15 Drawing Sheets

STEERABLE SCOOTER

BACKGROUND OF THE INVENTION

1) Field of the Invention

The invention herein relates to recreational vehicles, specifically an improved steerable scooter.

2) Description of the Prior Art

The structure of conventional steerable vehicles, as shown in FIG. 1, is typically comprised of a handlebar 11 and a caster member 12 respectively disposed at the top and bottom ends of a front stem 10, the said caster member 12 extending towards the back and having a front wheel 13 installed on each of its two sides, a rear tube 20 having a rear wheel 21 on each of its two ends, a frame 30 conjoined between a head tube 14 and the rear tube 20, and a saddle 40 mounted on the frame 30. After the rider is seated on the saddle 40, both hands are used to turn and control the handlebar 11, thus the said caster member 12 and two front wheels 13 which are disposed on it can be steering coordinately, prompting the movement of the two front wheels 13 to the left and right and causing the said rear wheels 21 to follow such that the entire vehicle proceeds on a course determined by the rider. While it cannot be denied that the control approach of such an arrangement effectively provides for children's riding and operation, the following shortcomings still await improvement:

1. Referring to FIG. 2, the purpose of the two said front wheels 13 as well as the two rear wheels 21 is to provide four points of ground contact in perfect balance while the steerable vehicle travels forward in straight line; when the handlebar 11 is turned, the inner side of the front wheel 13' is closer to the frame 30 and arrayed with the two rear wheels 21 into a balanced triangular formation; however, it is known that when the two front wheels 13 are turned in the opposite direction by the handlebar 11, a greater amount of turning friction is generated due to the simultaneous ground contact of the said two wheels 13, requiring more strength to operate the handlebar 11 and causing it to be more unresponsive.

2. Since the said two front wheels 13 are respectively situated at the two sides of the frame 30, as the individual wheels contact the ground when the road surface is irregular, the front wheels 13 and the two rear wheels 21 do not individually contact the ground in an evenly arrayed isosceles or equilateral triangle such that the steerable vehicle easily slides and is unstable.

3. Since the said two front wheels 13 are disposed on one extremity of the caster member 12 and situated at the rear extent of the front stem 10, when the front wheels 13 are turned to any particular side, the opposite extremity of the caster member 12 is suspended off the ground and unsupported; this state has no affect while the steerable vehicle proceeds in a straight line, but when the rider applies force towards the suspended side to change direction, center of gravity instability often results in dangerous slide outs.

4. Since such steerable vehicles are only capable of carrying and being operated by small younger children, they are not suitable for larger children, teenagers, and older people and, as such, have limited recreational and application value.

In view of the above situation, some manufacturers have introduced an improved steerable vehicle which, as shown in FIG. 3, consists of a caster member 12 at the lower extent of a front stem 10 having an assisting wheel 15 at one extremity that is slightly higher than two front wheels 13, wherein the assisting wheel 15 and the two front wheels 13 at the rear extent are arranged in a triangular formation that is narrow at the anterior and wide at the posterior such that when the handlebar 11 executes a turn and leans in the direction of the said turn, the said assisting wheel 15 serves as a support point that is present at the appropriate time to prevent lateral slide outs. Such an improvement undoubtedly enhances usage and safety, but since the said assisting wheel 15 is situated at the lower extent of the front stem 10 and the center of gravity is situated off to the side of the change in direction and not at the exact lower extent of the front stem 10 when the handlebar 11 is turned, therefore, while the placement of the said assisting wheel 15 effectively prevents lean during small angle turns by the handlebar 1, it is still incapable of counteracting lean when large angle turns are executed. Additionally, given that the handlebar 11 of the conventional steerable vehicle requires more physical effort to control, is less responsive, tends to lose traction on uneven road surfaces, is unstable, and of limited practical application, the improvement effected is not significant enough to make a difference.

SUMMARY OF THE INVENTION

The primary objective of the invention herein is to provide an improved steerable scooter, wherein a single front wheel for turning and inclination as well as two rear wheels constantly contact the ground simultaneously in a three-point supportive formation to provide for optimal stability and responsiveness due to reduced friction when turns are executed by the said steerable scooter.

Another objective of the invention herein is to provide an improved steerable scooter, wherein assisting wheels are installed on two sides at the bottom end of a rearwardly inclined front stem that are marginally higher than and simultaneously articulated with the front wheel and since the front wheel at the rear extent forms a triangular formation that is wide at the anterior and narrow at the posterior, when the handlebar is turned for a larger angle, the said assisting wheel on the side of the turn affords ground contact support at the appropriate time, thereby enhancing utilization safety by effectively preventing slide outs due to excessive lean.

Yet another objective of the invention herein is to provide an improved steerable scooter, wherein a freely adjustable and removable saddle is installed on the frame and the two rear wheels are equipped with a synchronized brake mechanism to allow safe riding and, furthermore, the option of enjoying the scooter of the present invention while seated or standing on one foot, thereby effectively widening its scope of application.

DETAILED DESCRIPTION OF THE INVENTION

Figure 4:
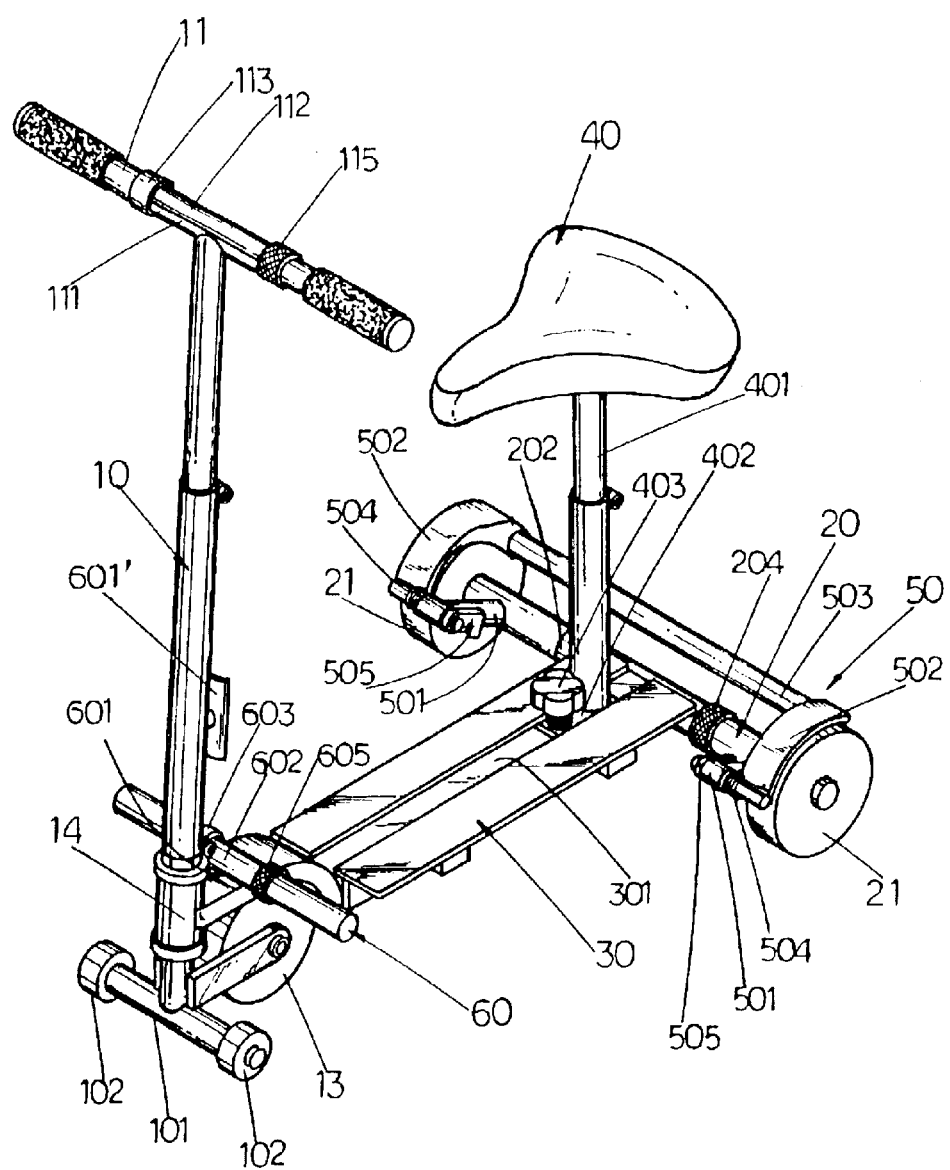
FIG. 4 is an isometric drawing of the invention herein.
Figure 6:
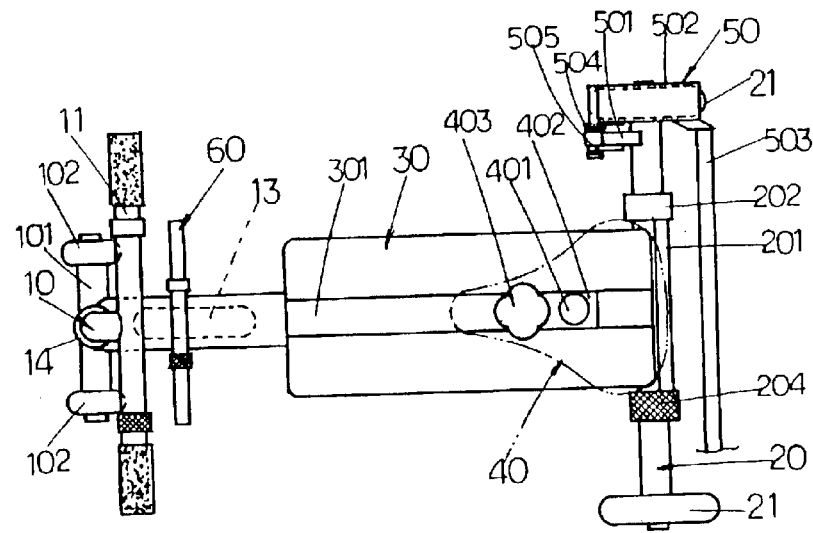
FIG. 6 is an orthographic drawing of FIG. 4, as viewed from the top.
Figure 5:
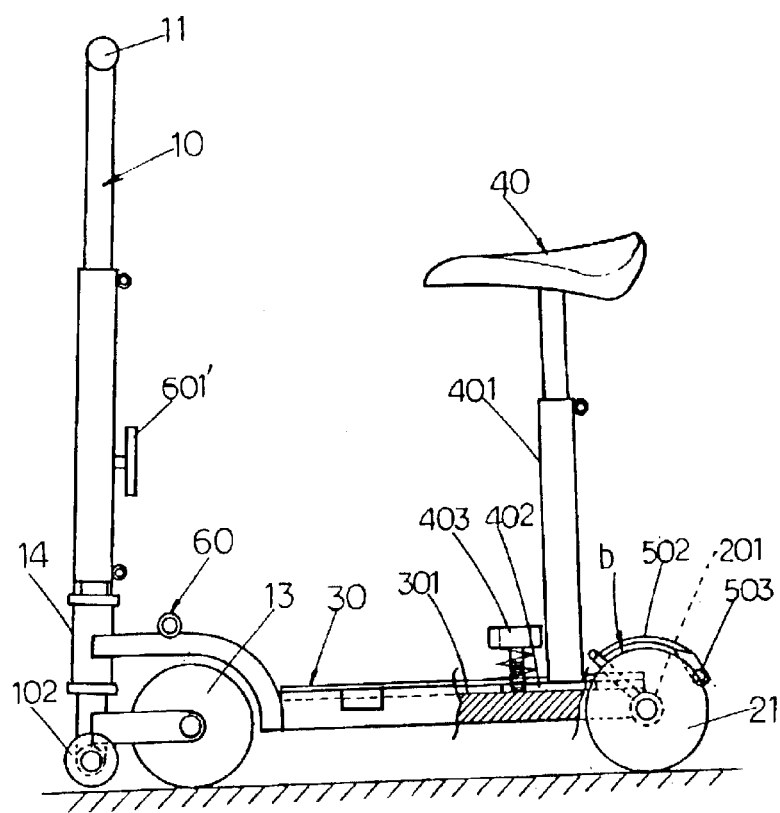
FIG. 5 is an orthographic drawing of FIG. 4, as viewed from the front.

Referring to FIG. 4, FIG. 5, and FIG. 6, the improved steerable scooter of the invention herein is comprised of a single front wheel 13 as well as two rear wheels 21 providing for leaning and directional control, with the said front wheel 13 and rear wheels 21 arrayed in a three-point, constant triangular formation; a front stem 10 disposed at a slight rearward incline, a horizontally oriented locating rod 101 projecting laterally from the two sides at the bottom end of the front stem 10, and assisting wheels 102 respectively installed on the extremities of the locating rod 101 that are marginally higher than the front wheel 13 (see FIG. 5), wherein the said assisting wheels 102 and the front wheel 13 all veer accordingly in a synchronized manner when the front stem 10 is turned; a frame 30 conjoined between a head tube 14 and a rear tube 20 that consists of a flat deck of a relatively large square area that provides for standing and, furthermore, a lengthwise track slot 301 through the center that provides for the placement of a slidable mounting plate 402 for the seat post 401 of a saddle 40 and the installation of screws 403 that fix the said mounting plate 402 at any position therein.

Figure 7:
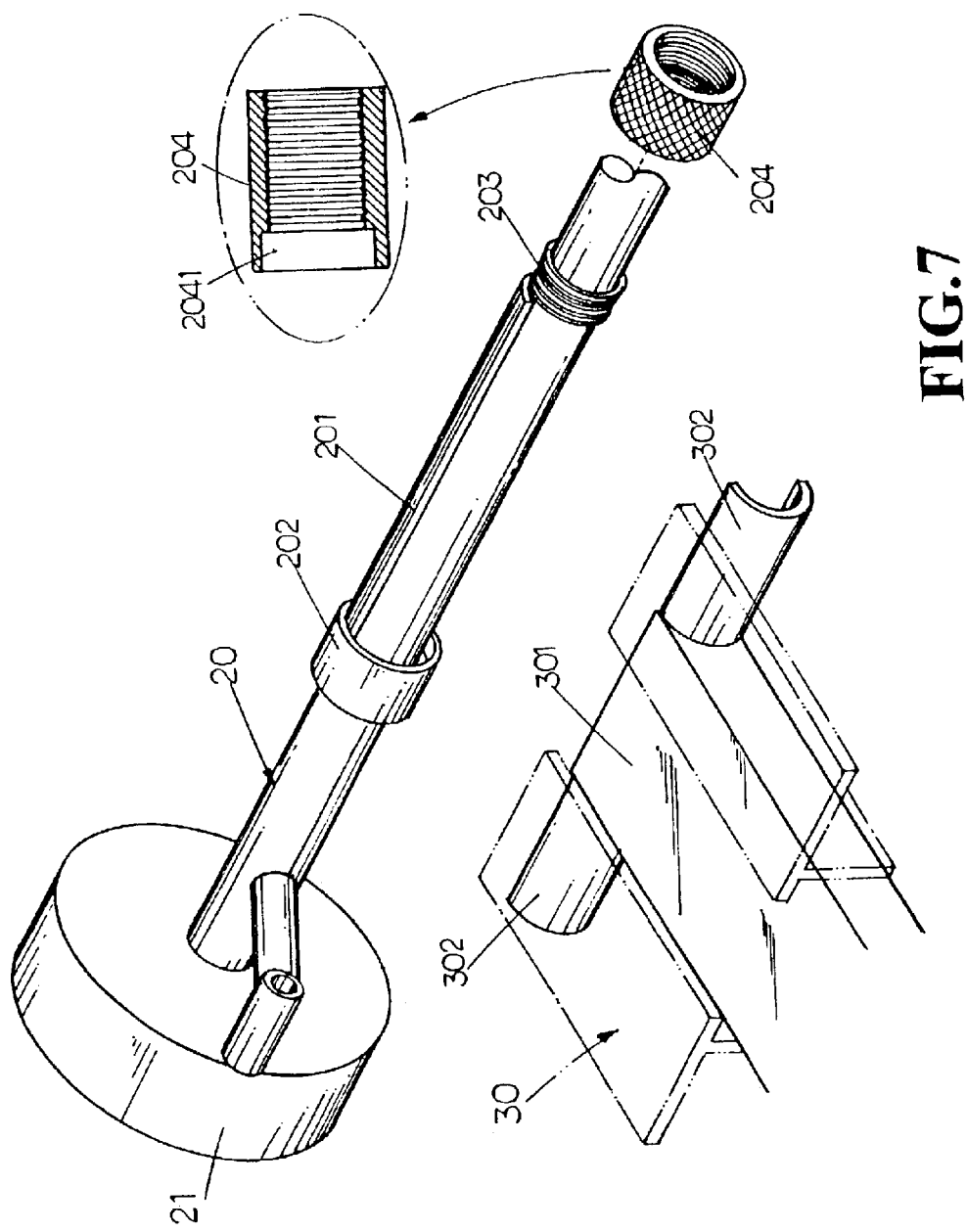
FIG. 7 is an isometric drawing of the rear tube structure of the invention herein.
Figure 8:
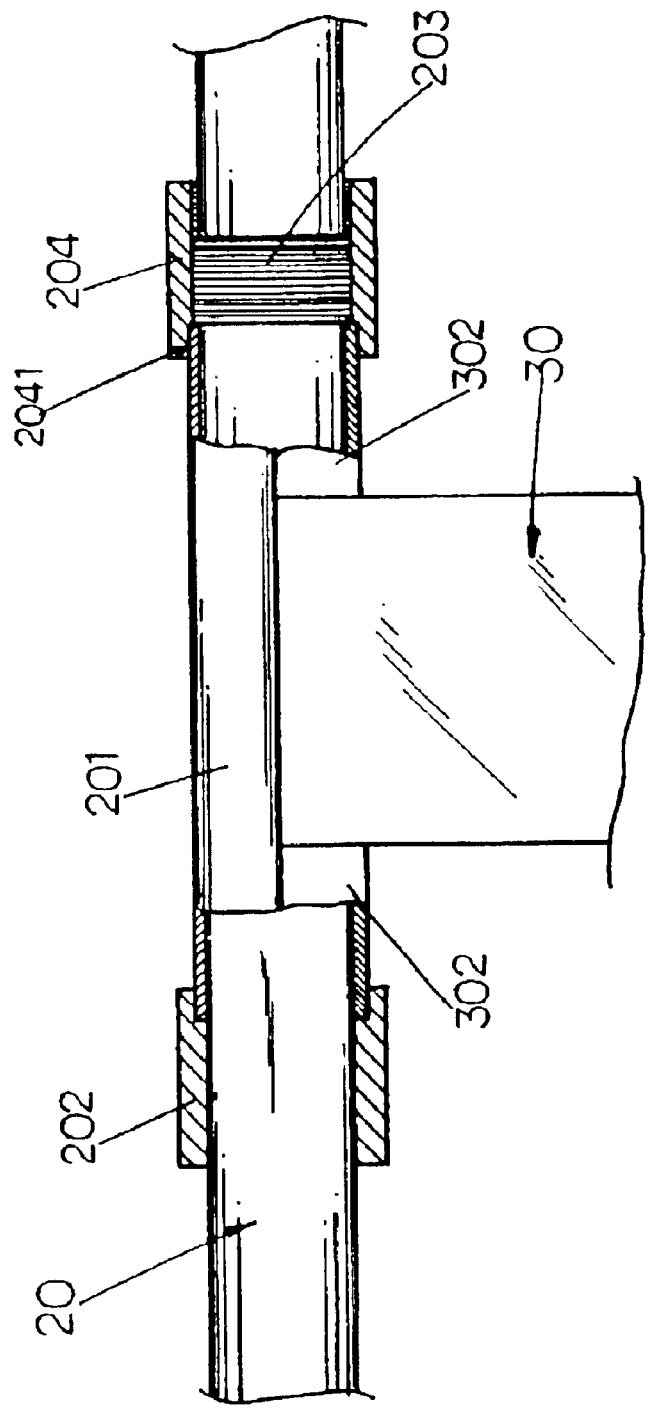
FIG. 8 is a cross-sectional drawing of the rear tube structure of the invention herein, as viewed from the top.

The said rear tube 20 providing for the installation of the two rear wheels 21 can be welded to the frame 30 to conserve fabrication and packaging materials as well as to facilitate portability; referring to FIG. 7 and FIG. 8, semi-circular locating tabs 302 nesting the rear tube 20 are respectively disposed at the two posterior sides of the frame 30 on a cross-sectionally semicircular pipe fitting 201 at the center section of the rear tube 20 matching the size of the locating tabs 302, a retainer 202 is situated over one end of the said pipe fitting 201, and a threaded section 203 is formed along the tubular surface at other end of the pipe fitting 201 provides for the fastening of a round nut 204; during assembly, the locating tab 302 at one posterior side of the said frame 30 is first slipped into the retainer 202 of the rear tube 20 such that the two locating tabs 302 are fully situated against the circumferential surface of the rear tube 20 and, furthermore, the pipe fitting 201 is positioned on the circumferential surface of the rear tube 20 and the round nut 204 fastened onto the threaded section 203 of the rear tube 20 such that the pipe fitting 201 and a locating tab 302 are ensconced in a sleeve section 2041 and unioned into a single structural entity, the said rear tube 20 and the frame 30 thereby easily, conveniently, and rapidly assembled into an integrated structural entity that is secure and solid, with the round nut 204 of course easily rotated to disassemble the rear tube 20 as necessary.

Following the conjoinment of the rear tube 20 and the frame 30, the height of the pipe fitting 201 on the circumferential surface of the rear tube 20 is lower than the track slot 301 (see FIG. 5) of the frame 30 such that the mounting plate 402 at the bottom of the seat post 401 is freely admitted through the track slot 301.

Figure 1:
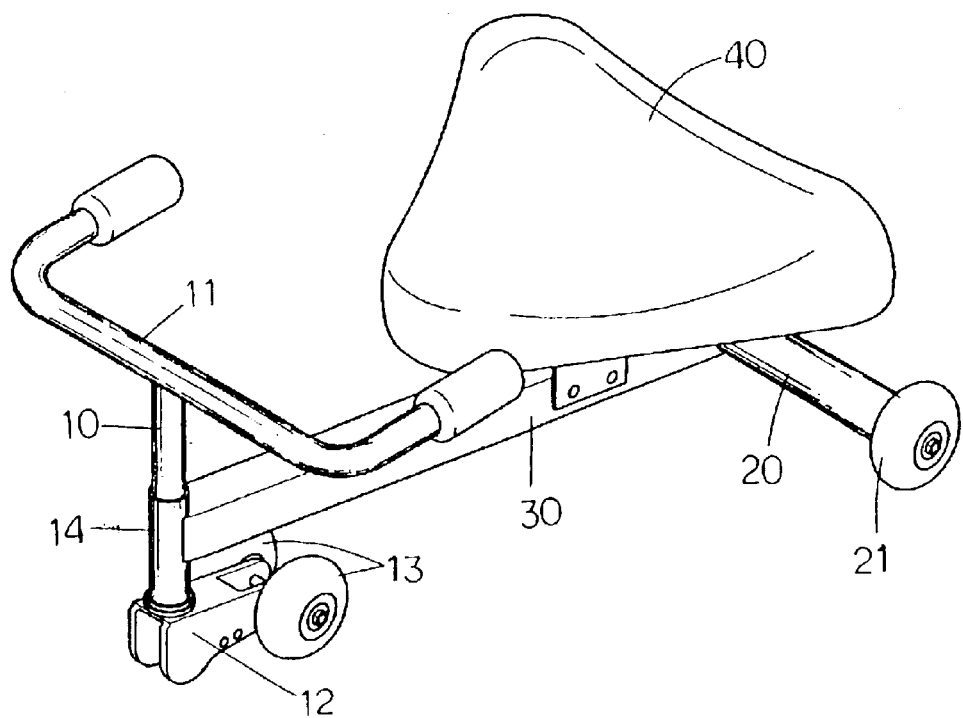
FIG. 1 is an isometric drawing of a conventional steerable vehicle (1).
Figure 2:
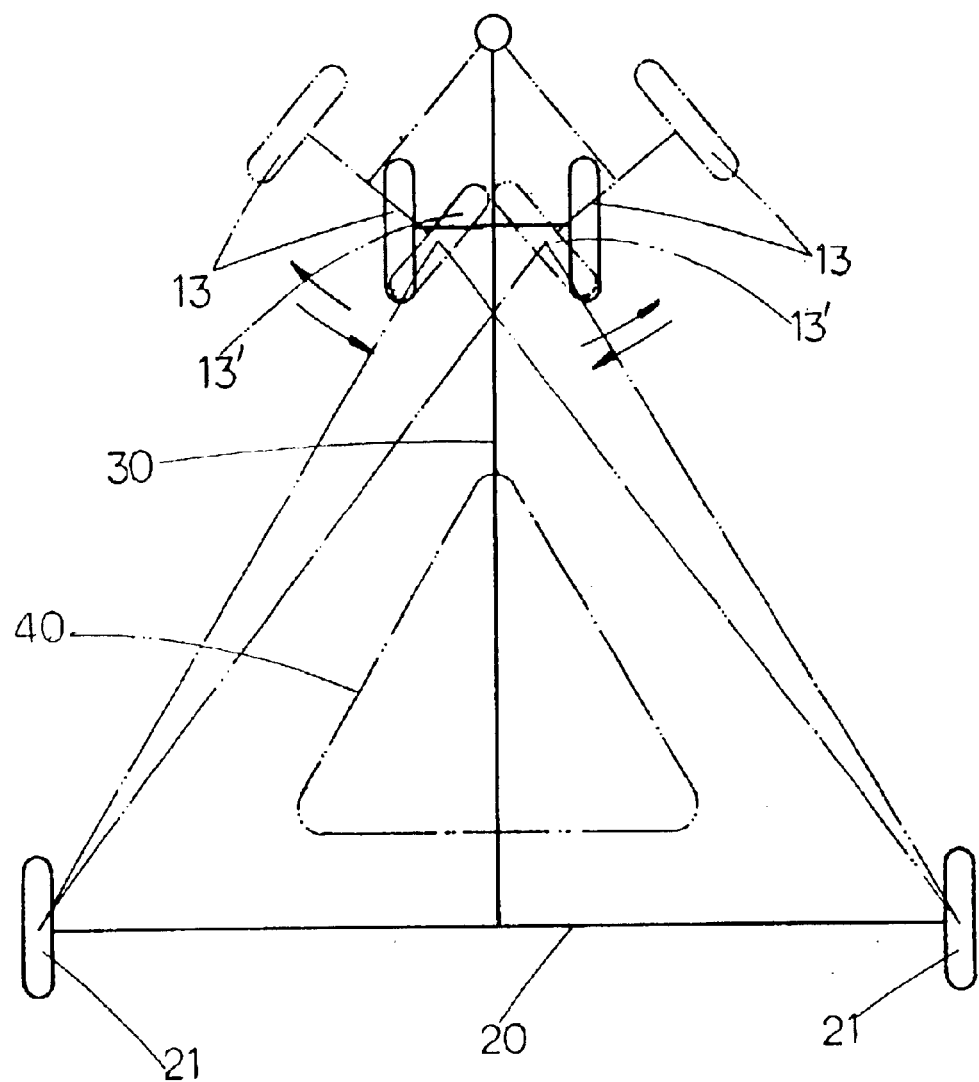
FIG. 2 is an orthographic drawing of FIG. 1 as viewed from the top that illustrates the steering process.
Figure 3:
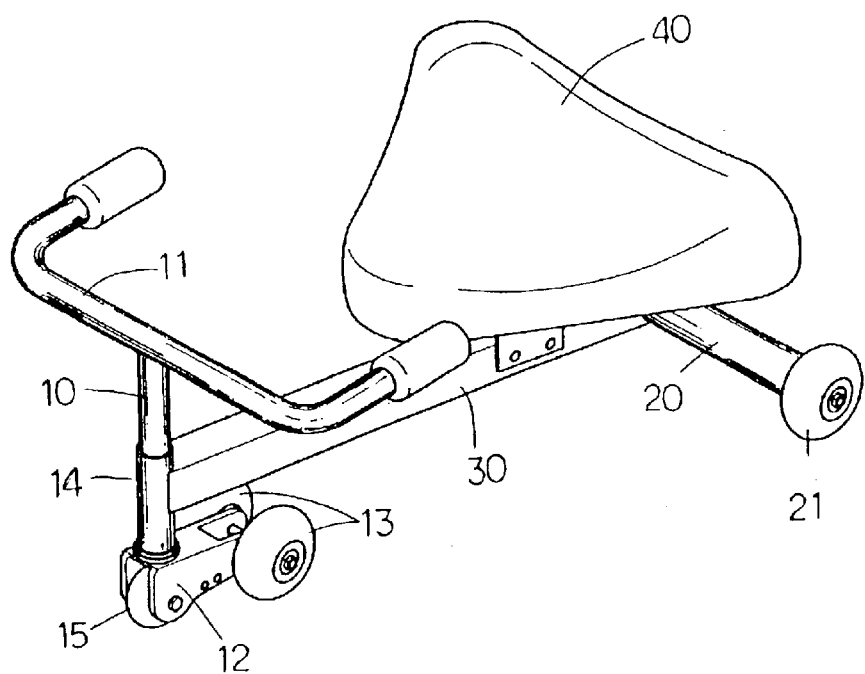
FIG. 3 is an isometric drawing of a conventional steerable vehicle (2).
Figure 9:
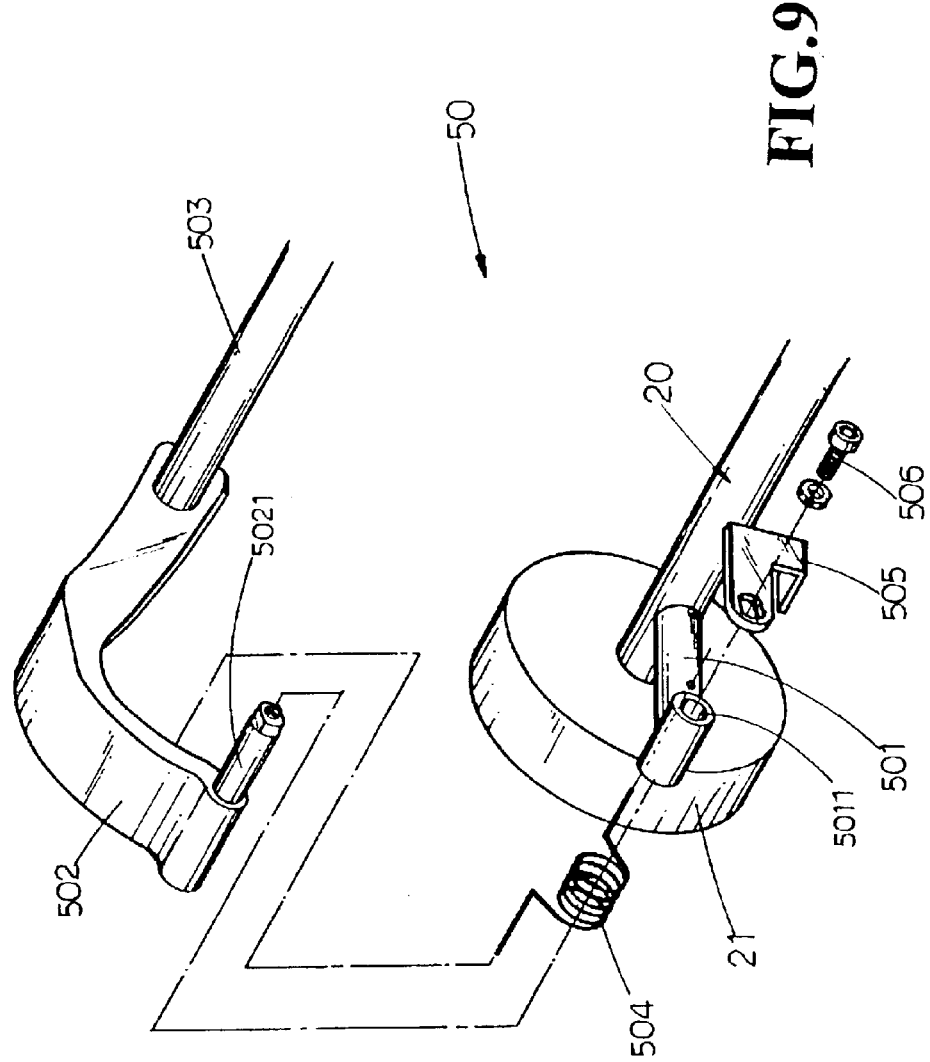
FIG. 9 is an isometric drawing of the brake mechanism of the invention herein.
Figure 11:
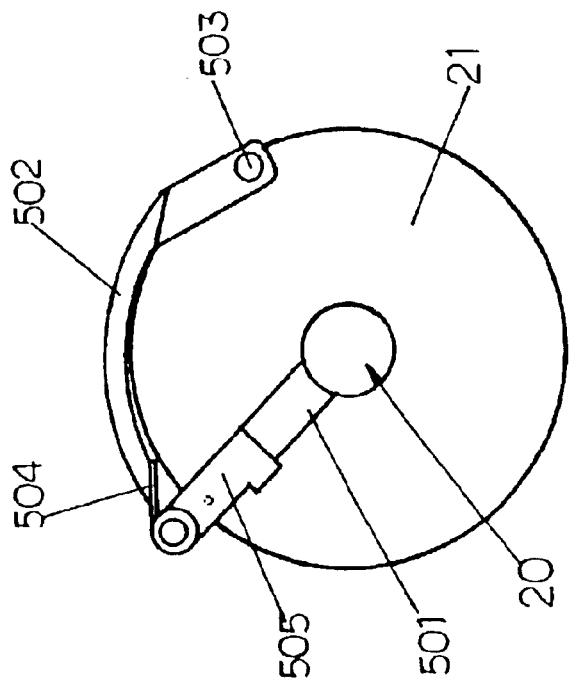
FIG. 11 is an orthographic drawing of the brake mechanism of the invention herein during actuation.
Figure 10:
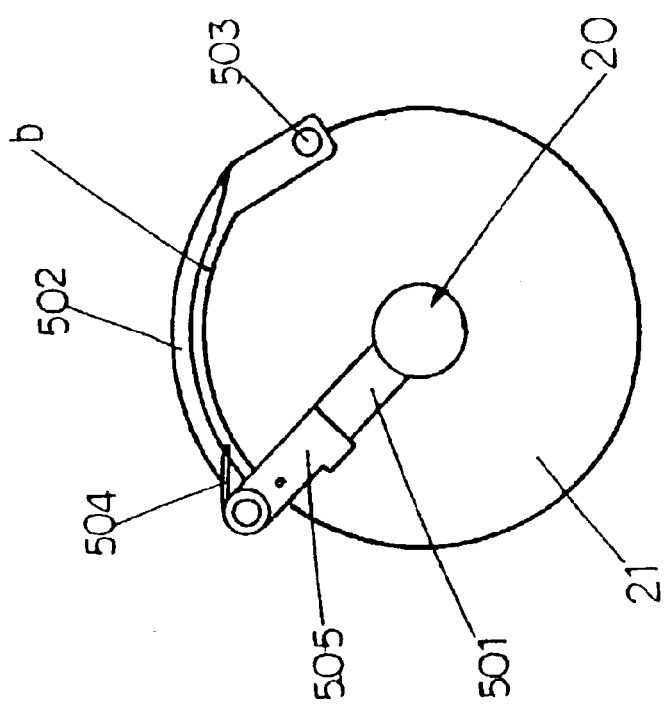
FIG. 10 is an orthographic drawing of the brake mechanism of the invention herein before actuation.

Referring to FIG. 9, a brake mechanism 50 is disposed proximal to the two rear wheels 21 and consists of a T-shaped mounting column 501 positioned at each of the two extremities of the rear tube 20 adjacent to a rear wheel 21, a brake plate 502 situated along the outer periphery of each rear wheel 21, a pin member 5021 extending from one end of the said two brake plates 502 placed through an insertion hole 5011 formed in the horizontal portion of the T-shaped mounting column 501, and a brake rod 503 connected to the other ends of the brake plates 502; the said pin member 5021 includes a torque spring 504 that is sleeved over it, a check piece 505, and a screw 506 for fastening to the mounting column 501; wherein, one end of the said torque spring 504 is fixed to the brake plate 502 and the other end is anchored to the mounting column 501 such that the brake rod 503 of the two brake plates 502 is always subjected to upward tension; after one end of the said check piece 505 is secured to the pin 5021, the other end is positioned at the lower extent of the mounting column 501 to limit the spring-loaded height of the brake plates 502 and thereby maintain a certain gap b between each brake plate 502 and the surface of the rear wheel 21. Referring to FIG. 10 and FIG. 1, when the steerable scooter of the present invention is moving forward, the gap b (see FIG. 10) is always present between each said brake plate 502 and rear wheel 21 surface due to the action of the torque spring 504; however, when the rider steps on the brake rod 503, the said two brake plates 502 are simultaneously applied against the surfaces of the two rear wheels 21 (see FIG. 11) to generate friction, thereby achieving reliable and, furthermore, consistent synchronized braking performance.

Figure 12:
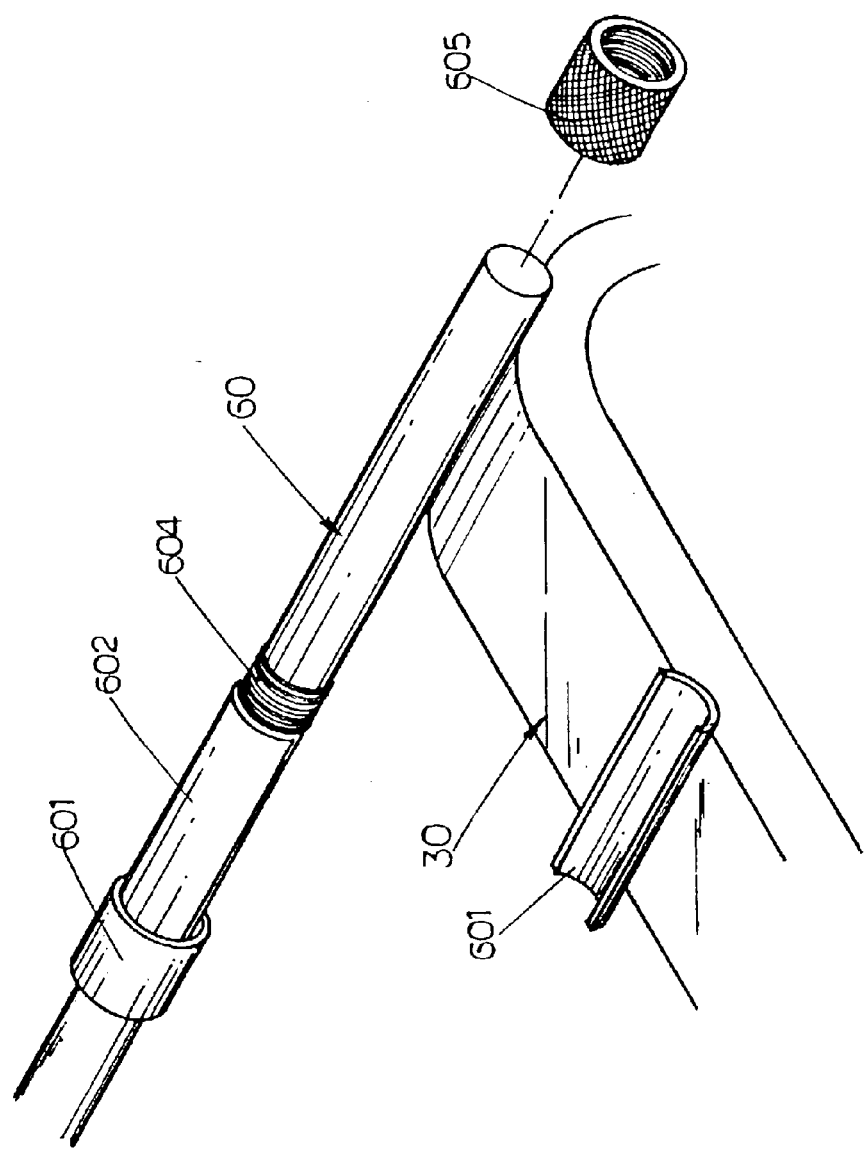
FIG. 12 is an isometric drawing of the foot bar of the invention herein.

Referring to FIG. 12, a foot bar 60 is installed on the front extremity of the frame 30 to provide for the placement of both legs as the rider is operating the steerable scooter while seated on the saddle 40; to save material and for utilization convenience, the foot bar 60 can also be situated at the rear tube 20; a mounting fixture 601 is disposed on the frame 30, the foot bar 60 has a pipe fitting 602 at its center section that is aligned for conjoinment to the mounting fixture 601, a holding nut 603 is situated at one end of the pipe fitting 602 to position it in the mounting fixture 601, and a threaded section 604 is formed at the other end of the pipe fitting 602, enabling the fastening of a round nut 605 against the distal end to secure the mounting fixture 601 and the pipe fitting 602 within to thereby achieve a sound assembly. As per utilization requirements, the said foot bar 60 is easily removed by unfastening the round nut 605 and, furthermore, can be similarly installed on another mounting fixture 601' positioned on the front stem 10 (see FIG. 4).

Figure 13:
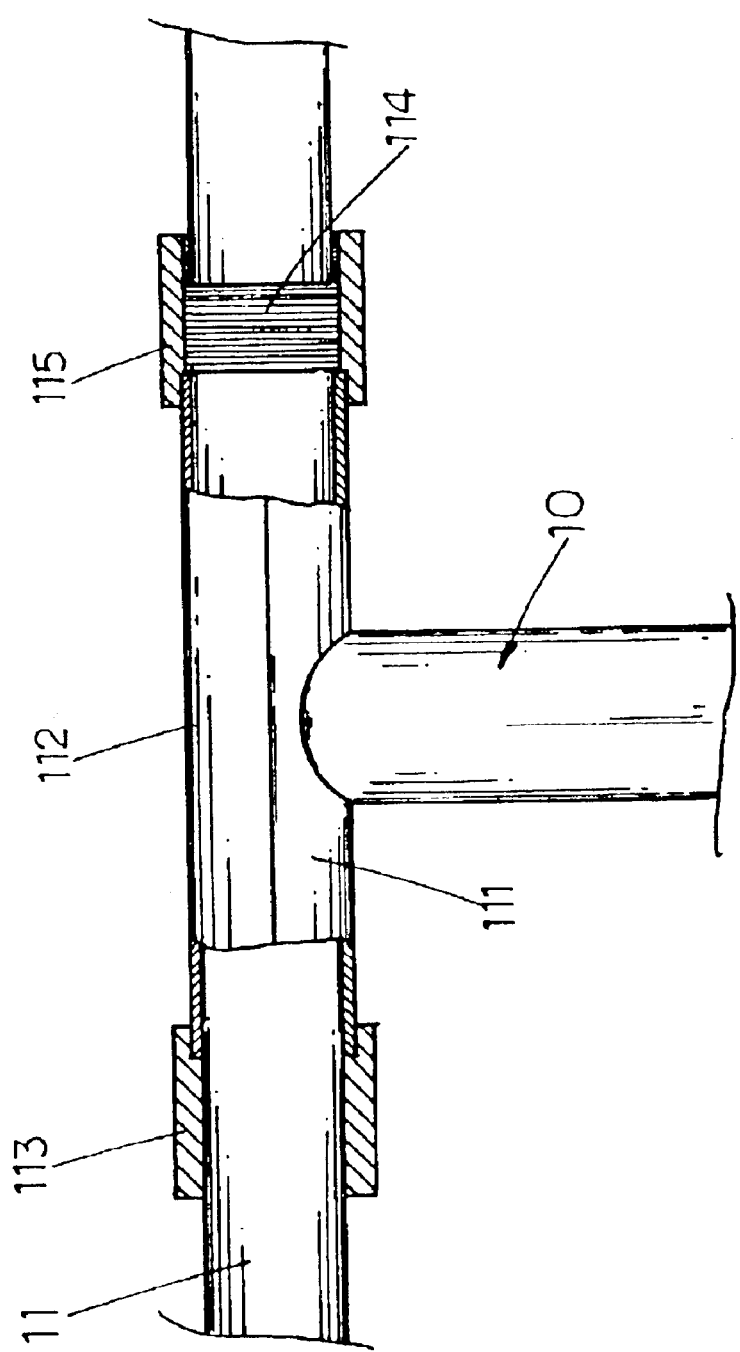
FIG. 13 is a cross-sectional drawing of the handlebar of the invention herein.

Referring to FIG. 13, the said handlebar 111 is of an arrangement similar to that immediately above and includes a mounting fixture 1111, a pipe fitting 112, a holding nut 1113, a threaded section 114, and a round nut 115 to enable free and, furthermore, simple assembly and disassembly to and from the front stem 10.

Figure 14:
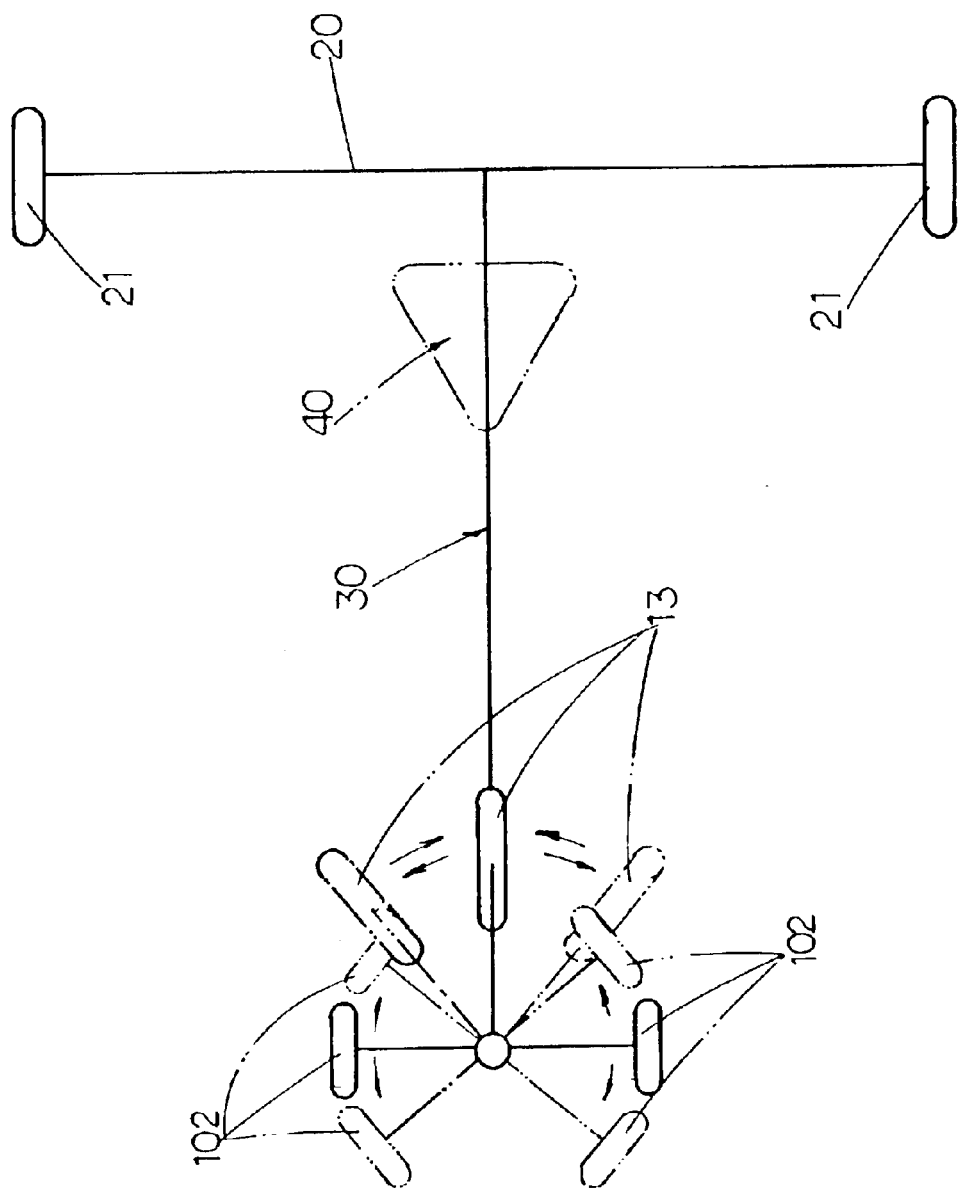
FIG. 14 is an orthographic drawing of the steering process, as viewed from the top.
Figure 17:
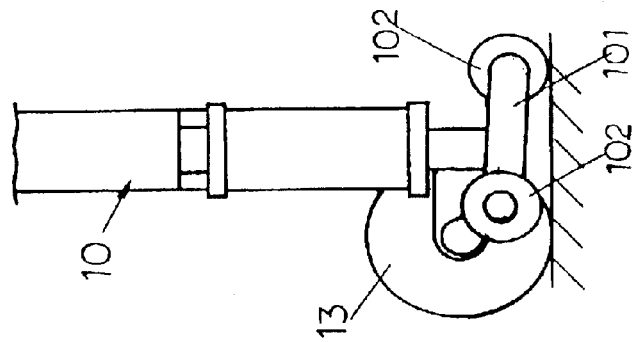
FIG. 17 is an orthographic drawing of the assisting wheels of the invention herein during the execution of a left turn.
Figure 16:
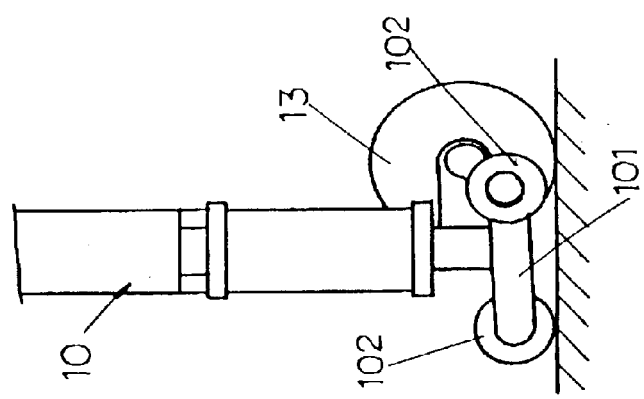
FIG. 16 is an orthographic drawing of the assisting wheels of the invention herein during the execution of a right turn.
Figure 15:
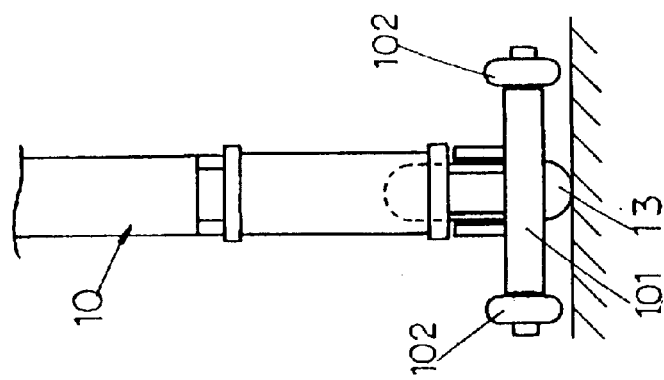
FIG. 15 is an orthographic drawing of the assisting wheels of the invention herein when proceeding in a straight line.

Referring to FIG. 14, since the present invention has a single front wheel 13 as well as two rear wheels 21 providing for leaning and directional control, with the said front wheel 13 and rear wheels 21 arrayed in a three-point, constant triangular formation, the steerable scooter herein is not only exceptionally stable during forward operation, the reduction of friction at the front wheel 13 also effectively affords greater handlebar 111 control and response. Referring to FIG. 15, FIG. 16, and FIG. 17, since the assisting wheels 102 installed on two sides at the bottom end of the front stem 10 are marginally higher than the front wheel 13, when the steerable scooter travels forward in a straight line (see FIG. 15), the said two assisting wheels 102 remain inactively poised at the sides of the front wheel 13, but when the handlebar 11 is turned for a larger angle and the assisting wheels 102 and the front wheel 13 are all re-oriented simultaneously, the assisting wheels 102 automatically tilt downward at the appropriate time due to the rearward inclined design of the front stem 10, thereby offsetting deviation from the center of gravity when the lean angle of the front wheel 13 is excessive to prevent sliding out from loss of lateral traction and thus effectively increasing utilization safety.

Figure 18:
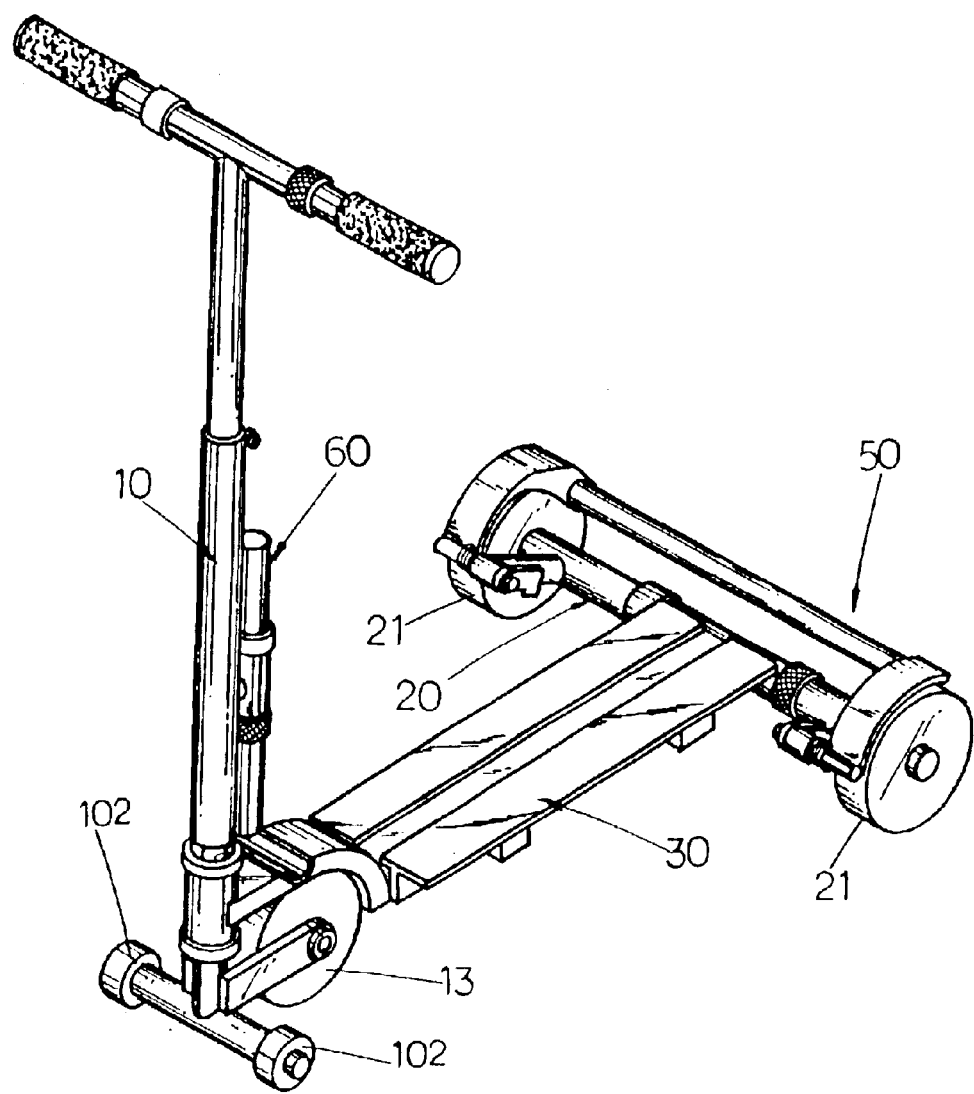
FIG. 18 is an isometric drawing of another embodiment of the invention herein.

In addition to the lengthwise track slot 301 that provides for the placement of the mounting plate 402 for the seat post 401 of the saddle 40 and the fixing of the said mounting plate 402 at any position by means of screws 403 to accommodate steerable scooter riders of all ages, the invention herein, as indicated in FIG. 18, allows the removal of the saddle 40 and the seat post 401 from the frame 30, enabling the rider to stand on the said frame 30 and actuate the synchronized brake mechanism 50 in the area of the two rear wheels 21 with one foot as the invention herein is utilized as a high speed skateboard, thereby effectively widening its scope of application.

Figure 19:
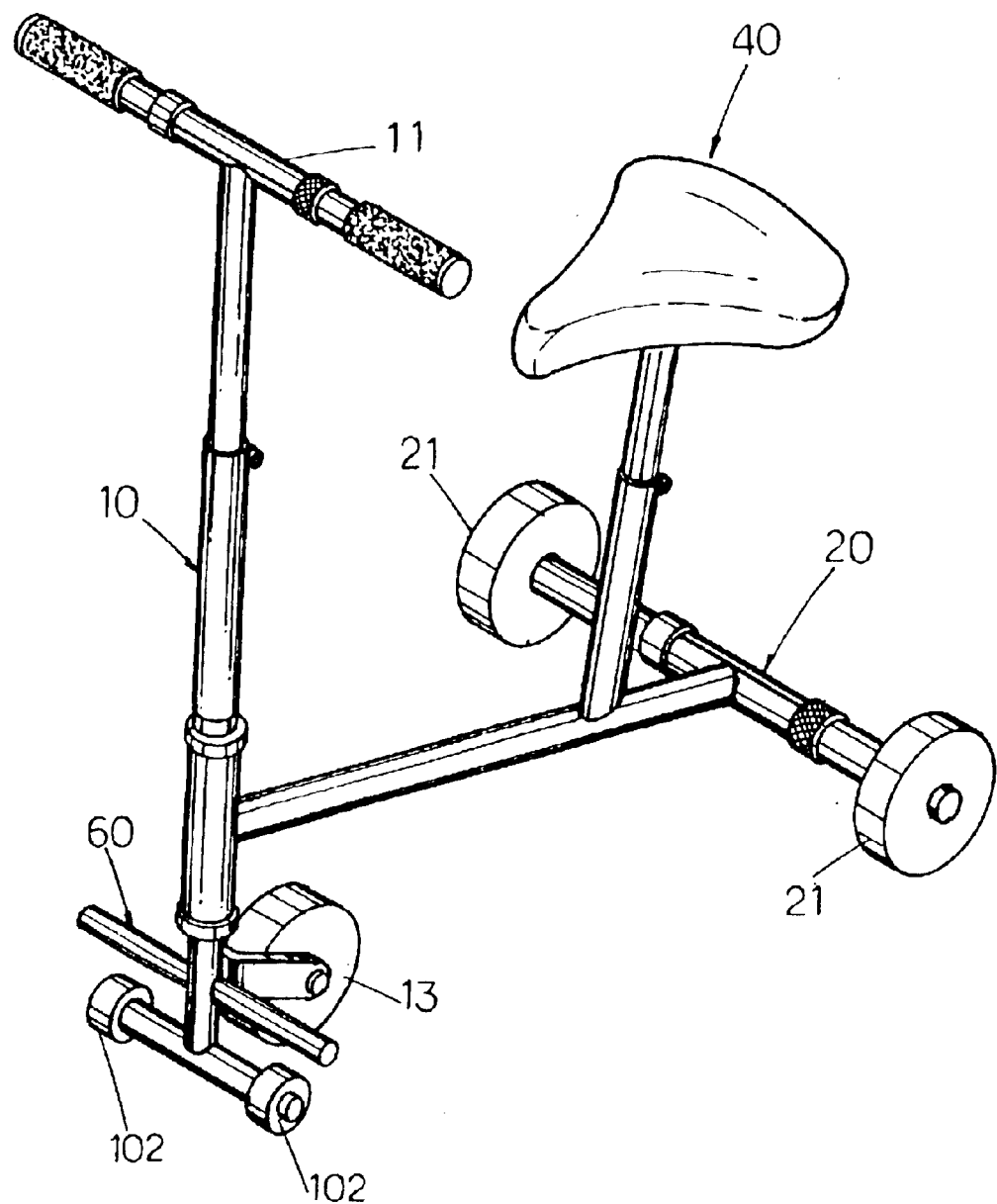
FIG. 19 is an isometric drawing of another embodiment of the invention herein.

Referring to FIG. 19, to accommodate market requirements, the invention herein is easily set up as an ordinary, low speed scooter by eliminating the synchronized brake mechanism 50; however, the arrangement of the rearward inclined front stem 10, the single front wheel 13, and the assisting wheels 102 installed on two sides at the bottom end of the front stem 10 remain unchanged.

What is claimed is:

1. A steerable scooter, comprising: a single front wheel and two rear wheels in a three-point supportive formation on a frame; a front stem disposed at a slight rearward incline, a horizontally oriented locating rod projecting laterally from two sides at a bottom end of said front stem, and first and second assisting wheels respectively installed on extremities of said locating rod disposed higher than said front wheel, said first and second assisting wheels being disposed to alternately align with said front wheel in height when said front stem is angularly displaced to respective first and second angular positions relative to said frame, said frame extending between a head tube and a rear tube, said frame including a flat deck for supporting a standing user and a lengthwise track slot through the center thereof for the free placement and removal of a saddle seat post; a foot bar installed at a front extremity of said frame; and a brake mechanism disposed adjacent said two rear wheels; whereby said scooter is configured for seated or standing operation; said first assisting wheel concurrently.

2. A steerable scooter comprising:
a single front wheel and two rear wheels in a three-point supportive formation on a frame; a front stem disposed at a slight rearward incline, a horizontally oriented locating rod projecting laterally from two sides at a bottom end of said front stem, and assisting wheels respectively installed on extremities of said locating rod disposed higher than said front wheel, said frame extending between a head tube and a rear tube, said frame including a flat deck for supporting a standing user and a lengthwise track slot through the center thereof for the free placement and removal of a saddle seat post; a foot bar installed at a front extremity of said frame; and a brake mechanism disposed adjacent said two rear wheels; whereby said scooter is configured for seated or standing operation;
said frame and the said rear tube joined by semicircular locating tabs nesting said rear tube respectively disposed at two posterior sides of said frame on a cross-sectionally semicircular pipe fitting at a center section of said rear tube that matches the size of said locating tabs, a retainer being situated at one end of said pipe fitting, and a threaded section being formed along a tubular surface at another end of said pipe fitting for the fastening of a round nut, said pipe fitting and said locating tabs being coupled, whereby said rear tube and said frame are assembled into an integrated structure.

3. A steerable scooter comprising:
a single front wheel and two rear wheels in a three-point supportive formation on a frame; a front stem disposed at a slight rearward incline, a horizontally oriented locating rod projecting laterally from two sides at a bottom end of said front stem, and assisting wheels respectively installed on extremities of said locating rod disposed higher than said front wheel, said frame extending between a head tube and a rear tube, said frame including a flat deck for supporting a standing user and a lengthwise track slot through the center thereof for the free placement and removal of a saddle seat post; a foot bar installed at a front extremity of said frame; and a brake mechanism disposed adjacent said two rear wheels; whereby said scooter is configured for seated or standing operation;
said brake mechanism being disposed proximal to said two rear wheels and inclusing a T-shaped mounting column positioned at each of two extremities of said rear tube adjacent to said rear wheels, a brake plate situated along an outer periphery of each said rear wheel, a pin member extending from one end of said two brake plates placed through an insertion hole formed in a horizontal portion of said T-shaped mounting column, and a brake rod connected to other ends of said brake plates; said pin members including a torque spring sleeved thereover and a check piece; two ends of said torque spring being respectively fixed to said brake plates and said mounting column, and end of said check piece being anchored to said mounting column such that the resultant upward tension maintains a gap between each said brake plate and surface of one said rear wheel.

4. A steerable scooter comprising:

a single front wheel and two rear wheels in a three-point supportive formation on a frame; a front stem disposed at a slight rearward incline, a horizontally oriented locating rod projecting laterally from two sides at a bottom end of said front stem, and assisting wheels respectively installed on extremities of said locating rod disposed higher than said front wheel, said frame extending between a head tube and a rear tube, said frame including a flat deck for supporting a standing user and a lengthwise track slot through the center thereof for the free placement and removal of a saddle seat post; a foot bar installed at a front extremity of said frame; and a brake mechanism disposed adjacent said two rear wheels; whereby said scooter is configured for seated or standing operation;

said front stem having a handlebar disposed at a semicircular mounting fixture formed at a top end thereof, a pipe fitting aligned with said mounting fixture at a center section of the handlebar, a holding nut at one end of said pipe fitting securing one end of said mounting fixture, and a threaded section along an outer surface at an end of said handlebar such that a round nut is fastened to secure said pipe fitting within the other end of said mounting fixture to effect mutual conjoinment.

\* \* \* \* \*